United States Patent
Kim et al.

(10) Patent No.: US 8,140,055 B2
(45) Date of Patent: Mar. 20, 2012

(54) METHOD FOR PERFORMING DIGITAL BROADCASTING SERVICE IN A DUAL-HINGE TYPE MOBILE TERMINAL

(75) Inventors: Kang-Wook Kim, Daegu (KR); Hyoung-Rae Cho, Daegu (KR)

(73) Assignee: Samsung Electronics Co., Ltd (KR)

( * ) Notice: Subject to any disclaimer, the term of this patent is extended or adjusted under 35 U.S.C. 154(b) by 958 days.

(21) Appl. No.: 11/605,823

(22) Filed: Nov. 29, 2006

(65) Prior Publication Data
US 2007/0123325 A1    May 31, 2007

(30) Foreign Application Priority Data
Nov. 29, 2005   (KR) ................ 10-2005-0114861

(51) Int. Cl.
*H04L 12/58*  (2006.01)
*H04M 1/00*   (2006.01)
*H04M 9/00*   (2006.01)

(52) U.S. Cl. ............... 455/412.1; 455/575.1; 455/575.3; 379/433.11; 379/433.12; 379/433.13

(58) Field of Classification Search .............. 455/412.1, 455/90.3, 128, 575.1, 575.3; 379/433.11–433.13
See application file for complete search history.

(56) References Cited

U.S. PATENT DOCUMENTS

| | | | |
|---|---|---|---|
| 2004/0114052 A1* | 6/2004 | Sin ................................. | 348/570 |
| 2005/0070327 A1* | 3/2005 | Watanabe ................... | 455/552.1 |
| 2005/0144560 A1* | 6/2005 | Gruen et al. .................. | 715/711 |
| 2005/0245296 A1* | 11/2005 | Hong et al. ................. | 455/575.3 |
| 2006/0082518 A1* | 4/2006 | Ram ............................. | 345/1.1 |
| 2006/0203083 A1* | 9/2006 | Wilson et al. .............. | 348/14.02 |

FOREIGN PATENT DOCUMENTS

| | | | |
|---|---|---|---|
| JP | 2005-303365 | * | 10/2005 |
| WO | WO 2004/061568 | | 7/2004 |

* cited by examiner

Primary Examiner — Un C Cho
Assistant Examiner — Jing Gao
(74) Attorney, Agent, or Firm — The Farrell Law Firm, P.C.

(57) ABSTRACT

Disclosed is a method for performing a digital broadcasting service in a dual-hinge type mobile terminal including a main housing and a folder, in which the folder is closed and opened with respect to the main housing in such a manner that the folder moves closely to or away from the main housing about a first hinge and a second hinge, and the mobile terminal has a first display mode and a second display mode according to an opening direction of the folder, the method including informing a user about reception of a call, when the call is received during while a digital broadcasting service is being performed in the first display mode; stopping the digital broadcasting service and connecting the call, when a mode transition from the first display mode to the second display mode is performed according to an opening direction of the folder; and releasing a call connection and re-performing the digital broadcasting service upon request of call disconnection by a user.

17 Claims, 14 Drawing Sheets

METHOD FOR PERFORMING DIGITAL BROADCASTING SERVICE IN A DUAL-HINGE TYPE MOBILE TERMINAL

PRIORITY

This application claims the benefit under 35 U.S.C. 119(a) of an application entitled "Method For Performing Digital Broadcasting Service In Mobile Terminal" filed in the Korean Intellectual Property Office on Nov. 29, 2005 and assigned Serial No. 2005-114861, the entire contents of which are incorporated herein by reference.

BACKGROUND OF THE INVENTION

1. Field of the Invention

The present invention relates generally to a mobile terminal capable of receiving a digital broadcast, and more particularly to a method for receiving a digital broadcasting service in a dual-hinge type mobile terminal.

2. Description of the Related Art

Typically, digital broadcasting refers to a digital broadcasting service for providing digital broadcasts of a high picture quality and high sound quality to users in replacement of the conventional analog broadcasting. Digital broadcasting receivers include mobile terminals, receivers for vehicles, and receivers for home use, and can be equipped in portable terminals.

Recently, with the development of digital broadcasting technology and mobile communication technology, digital broadcasting service enabling the user to view digital broadcasts even while the user is moving has become a matter of increasing concern. In particular, digital multimedia broadcasting (DMB) service using a mobile terminal has become a matter of great concern. The DMB is a broadcasting service that enables a user to view diverse multimedia broadcasts through multiple channels using a personal portable receiver having a non-directional antenna mounted thereon or through a receiver for vehicles even while the user is moving.

Mobile terminals are now widely used by people of all ages throughout the world, and are recognized by people as an indispensable commodity which must always be carried with them.

Therefore, in light of portability concerns, designs of the mobile terminals have tended not only toward compactness, slimness, and lightness, but also toward multimedia availability with a wider variety of functions. In particular, future mobile terminals are expected to incorporate greater compactness, multi-functionality and multi-purpose utilization, and will likely be modified to be suitable for various multimedia environments or Internet environments.

Conventional mobile terminals may be classified into various types according to their external appearances. For example, mobile terminals may be classified into bar type mobile terminals, flip type mobile terminals and folder type mobile terminals.

The bar type mobile terminal has a single housing shaped like a bar. The flip type mobile terminal has a flip which is pivotably mounted to a bar-shaped housing by a hinge unit. The folder type mobile terminal has a folder coupled to a single bar-shaped housing by a hinge unit in such a manner that the folder can be rotated in order to be folded to or unfolded from the housing.

In addition, mobile terminals may be classified according to ways of opening and closing the mobile terminals such as rotation type mobile terminals and sliding type mobile terminals.

In the rotation type mobile terminal, two housings are coupled to each other in such a manner that one housing rotates to be opened or to be closed relative to the other. In the sliding type mobile terminal, two housings are coupled to each other in such a manner that one housing slides to be opened or closed relative to the other.

These variously classified mobile terminals can be easily understood by those skilled in the art.

Generally, the conventional mobile terminal includes a liquid crystal display (LCD) device having a rectangular display screen. Since the rectangular display screen employed in the folder type mobile terminal is constructed such that its vertical length is longer than its horizontal length, there exists a limitation in providing a wide screen in such a mobile terminal. That is, when the user views a digital broadcast or Video On Demand (VOD) using a mobile terminal, a display screen having its horizontal length longer than its vertical length is required in order to provide a wide display screen to the user. To this end, a dual-hinge type mobile terminal, which has a display screen capable of being positioned either in a state having a longer length in the horizontal direction (e.g. a landscape mode) or in a state having a longer length in the vertical direction (e.g. a portrait mode), has been developed.

A mobile terminal has become capable of multi-tasking, such that the mobile terminal is capable of processing an incoming call while receiving a digital broadcasting service. However, such multi-tasking has not been applicable to the dual-hinge type mobile terminal, in which its folder must be maintained in a closed position relative to the main housing and then moved to an opened position in order to enter the landscape mode or the portrait mode.

SUMMARY OF THE INVENTION

Accordingly, the present invention has been made to solve the above-mentioned problems occurring in the prior art, and an object of the present invention is to provide a method for performing a digital broadcasting service in a dual-hinge type mobile terminal, whereby a dual-hinge type mobile terminal is capable of multi-tasking so that it is possible to easily process a call or text message received while a digital broadcast is being output.

To accomplish this object, in accordance with one aspect of the present invention, there is provided a method for performing a digital broadcasting service in a mobile terminal including a main housing and a folder, in which the folder is closed and opened with respect to the main housing in such a manner that the folder moves closely to or away from the main housing about a first hinge and a second hinge, and the mobile terminal has a first display mode and a second display mode according to an opening direction of the folder, the method including informing about reception of a call, when the call is received during while a digital broadcasting service is being performed in the first display mode; stopping the digital broadcasting service and connecting the call, when a mode transition from the first display mode to the second display mode is performed according to an opening direction of the folder; and releasing a call connection and re-performing the digital broadcasting service upon request of call disconnection by a user.

Preferably, the method for performing a digital broadcasting service in a mobile terminal further includes performing a communication function using a speaker phone when a predetermined key for instructing to connect the call is input, following the act of informing about the reception of the call is performed.

More preferably, the method for performing a digital broadcasting service in a mobile terminal further including informing about reception of a text message, when the text message is received while the digital broadcasting service is being performed in the first display mode; and displaying the received text message in a predetermined area of a digital broadcast output window.

In accordance with another aspect of the present invention, there is provided a method for performing a digital broadcasting service in a mobile terminal including a main housing and a folder, in which the folder is closed and opened with respect to the main housing in such a manner that the folder moves closely to or away from the main housing about a first hinge and a second hinge, and the mobile terminal has a first display mode and a second display mode according to an opening direction of the folder, the method comprising the steps of: informing about the reception of a call, when the call is received while a digital broadcasting service is being performed in the first display mode; stopping the digital broadcasting service and connecting the call, when the folder in the first display mode is closed and then is again opened in a position for entering the first display mode; and releasing the call connection and re-performing the digital broadcasting service upon request of call disconnection by a user.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
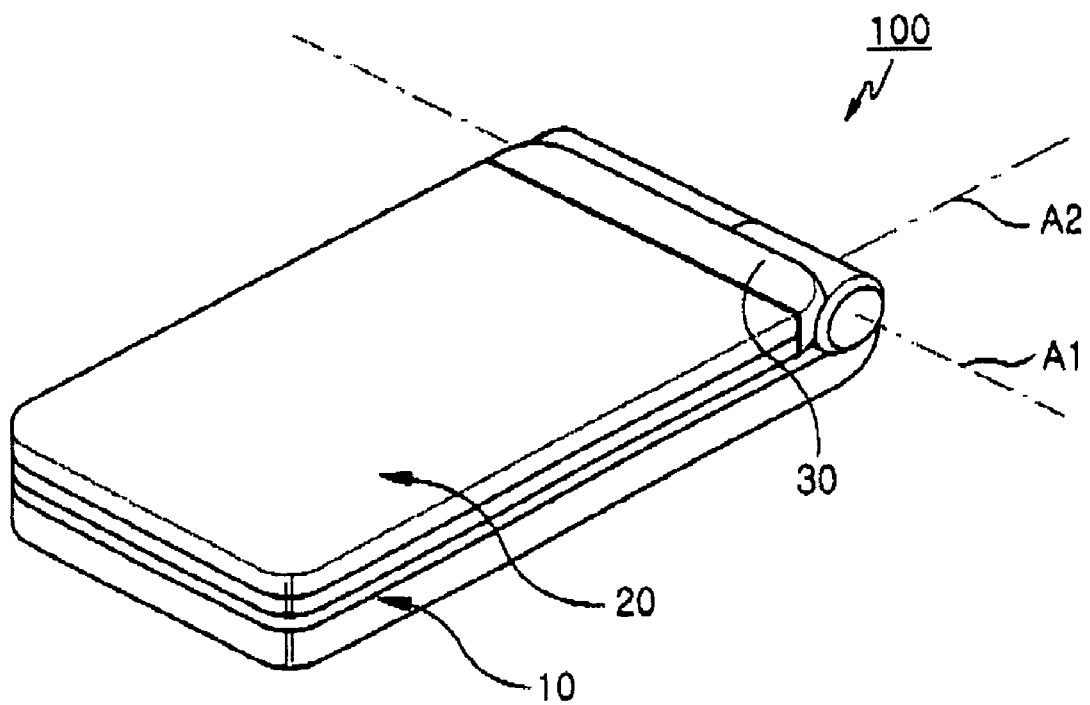
FIG. 1 is a perspective view illustrating a dual-hinge type mobile terminal according to the present invention.

Hereinafter, preferred embodiments of the present invention will be described with reference to the accompanying drawings. It is to be noted that the same elements are indicated with the same reference numerals throughout the drawings. In the following description of the embodiments of the present invention, a detailed description of known functions and configurations incorporated herein will be omitted when it may obscure the subject matter of the present invention.

It should be noted that a mobile terminal according to the present invention includes a main housing and a sub-housing (i.e. folder), which is constructed so that the folder is opened/closed with respect to the main housing by rotating the folder about each hinge axis positioned along the horizontal direction and vertical direction, thereby entering a first or second display mode depending on the opening direction of the folder.

Figure 2:
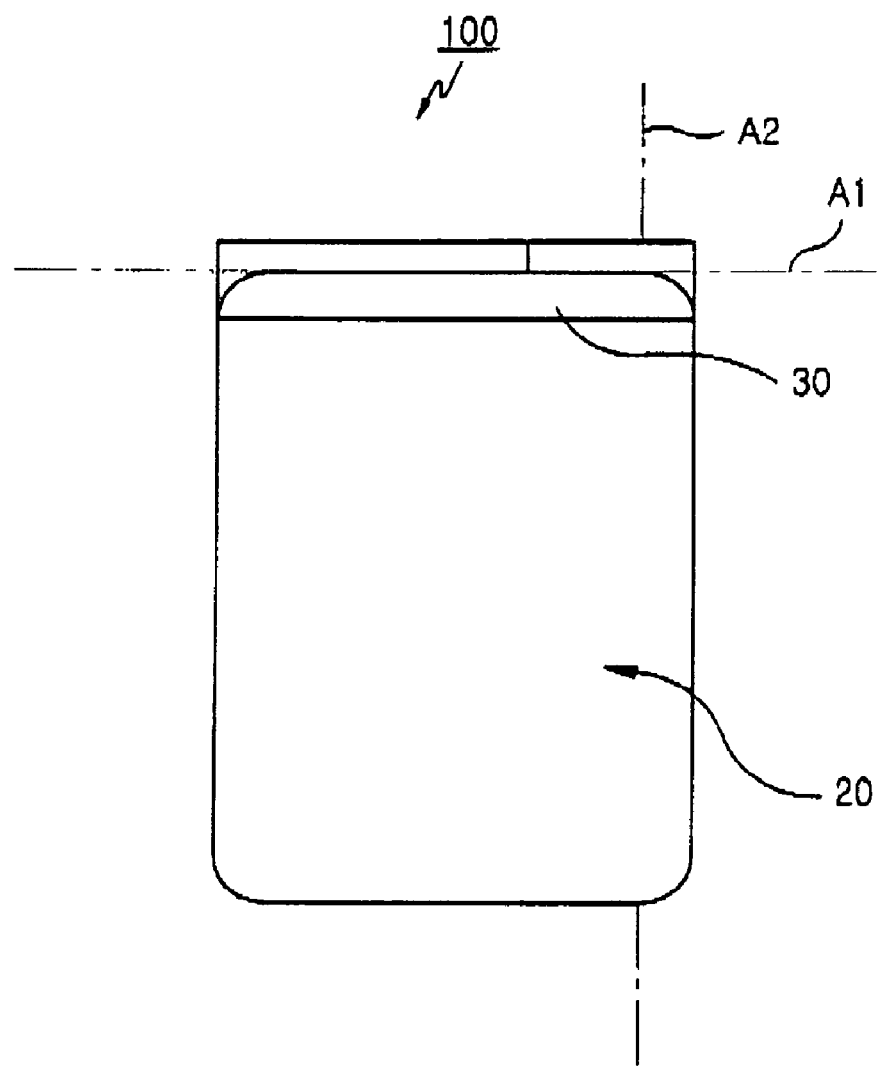
FIG. 2 is a top view of the dual-hinge type mobile terminal shown in FIG. 1.

FIG. 1 is a perspective view illustrating a dual-hinge type mobile terminal according to the present invention, and FIG. 2 is a top view of the dual-hinge type mobile terminal shown in FIG. 1.

A mobile terminal 100 according to the present invention includes a main housing 10, a first hinge axis A1 second hinge axis A2, and a sub-housing (folder) 20. The first hinge axis A1 extends in the vertical direction along the main housing 10, and the second hinge axis A2 extends in the horizontal direction along the main housing 10. The folder 20 is opened/closed with respect to the main housing 10 about either the first hinge axis A1 or second hinge axis A2. The folder 20 can be rotated about the first or second hinge axis so as to move closely to or away from the main housing 10.

The main housing 10 and the folder 20 may have a box shape, and are coupled with each other about the first hinge axis A1 in opposition to each other. The main housing 10, as well as the folder 20, is preferably constructed so that its horizontal and vertical lengths differ. Herein, it is preferred that each of the main housing 10 and folder 20 has its vertical length which is longer than its horizontal length.

The first hinge axis A1 transversely extends along an upper end of the main housing 10, and the second hinge axis A2 longitudinally extends along one side end of the main housing 10.

Also, the first hinge axis A1 and the second hinge axis A2 are perpendicular to each other, and the second hinge axis A2 rotates about the first hinge axis A1.

In addition, a connecting unit 30 is connected between the main housing 10 and the folder 20, and serves as a medium, which rotatably connects the folder 20 to the main housing 10 while rotating about the first hinge axis A1.

The folder 20 is provided on a rear surface thereof with a liquid crystal display.

Figure 3:
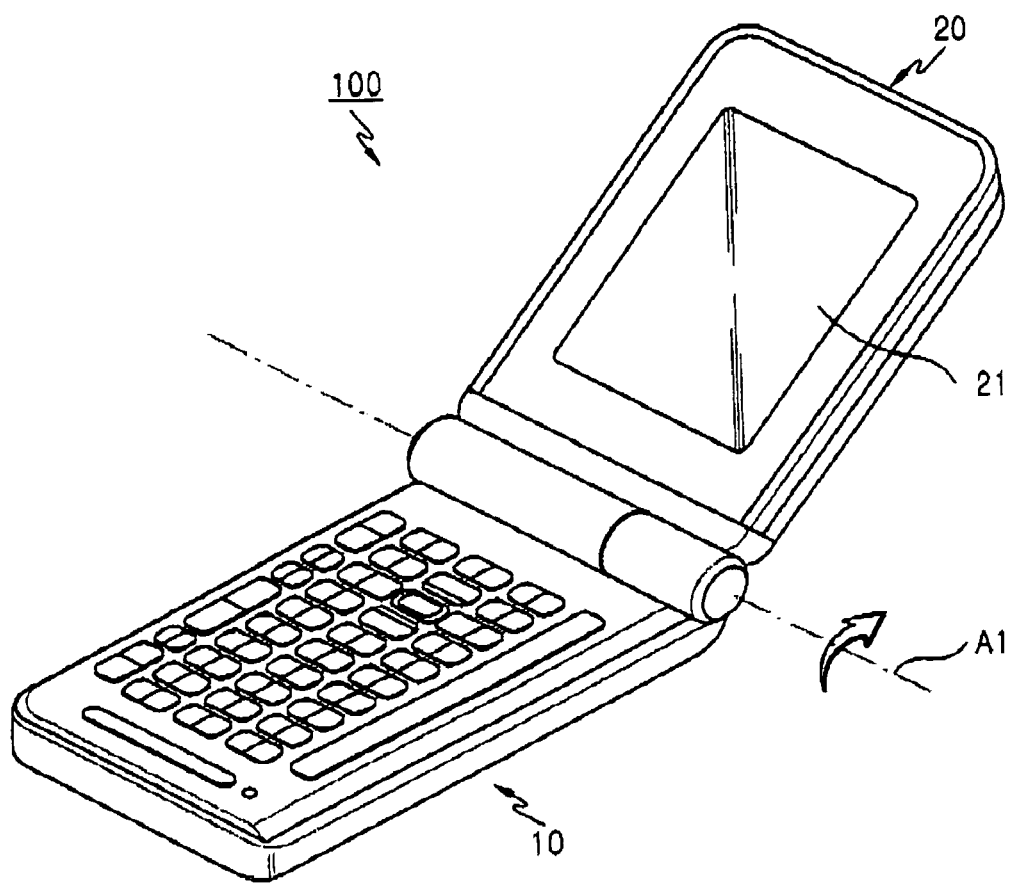
FIG. 3 is a perspective view illustrating the dual-hinge type mobile terminal with the folder opened about the first hinge axis according to the present invention.
Figure 4:
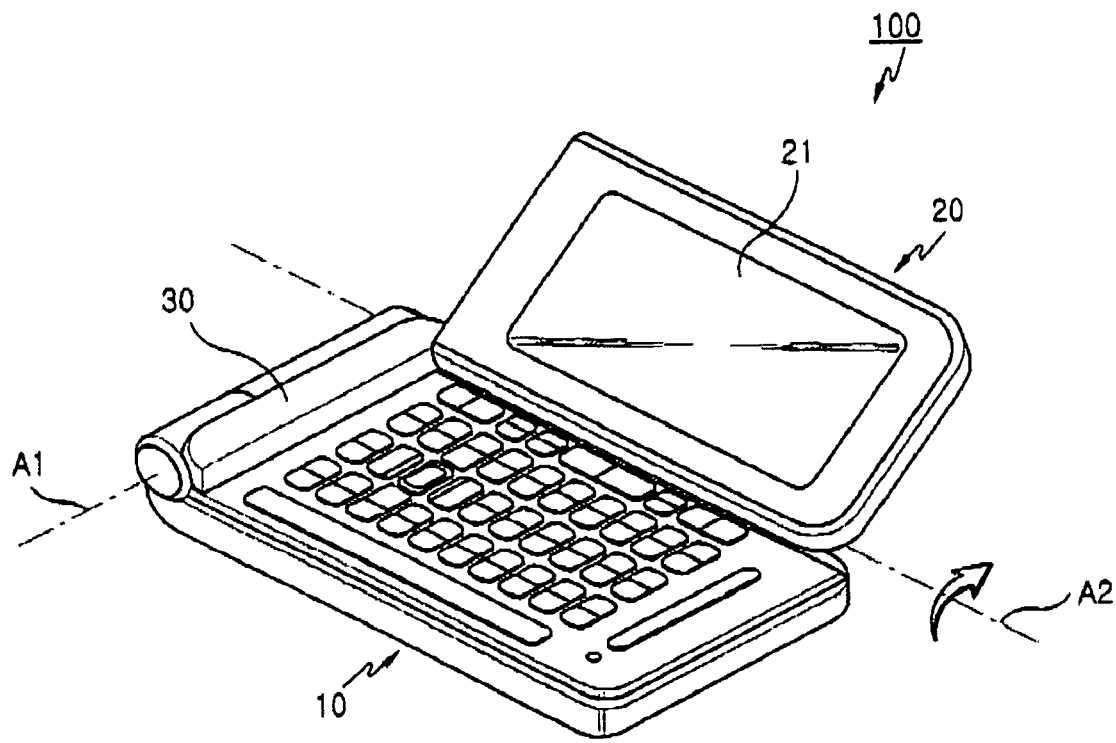
FIG. 4 is a perspective view illustrating the dual-hinge type mobile terminal with the folder opened about the second hinge axis according to the present invention.

FIG. 3 is a perspective view illustrating the dual-hinge type mobile terminal with the folder opened by rotating about the first hinge axis A1 according to the present invention. FIG. 4 is a perspective view illustrating the dual-hinge type mobile terminal with the folder opened by rotating about the second hinge axis A2 according to the present invention.

That is, FIG. 3 shows a state in which the folder 20 of the mobile terminal 100 has been opened by rotating about the first hinge axis A1, whereas FIG. 4 shows a state in which the folder 20 of the mobile terminal 100 has been opened by rotating about the first hinge axis A2.

In other words, FIG. 3 shows a state in which a liquid crystal display 21 is positioned such that its horizontal length is shorter than its vertical length (i.e. a portrait mode). FIG. 4 shows a state in which the liquid crystal display 21 is positioned such that its horizontal length is longer than its vertical length (i.e. a landscape mode).

Therefore, when the mobile terminal 100 performs a typical communication function in a phone mode, it is preferred that the mobile terminal 100 is used in the state shown in FIG. 3. In contrast, when the user views a digital broadcast or VOD (Video On Demand) using the mobile terminal 100, and when the user creates an E-mail message or transmits/receives a created E-mail message, it is preferred that the mobile terminal 100 is used in the state shown in FIG. 4. In the state as shown in FIG. 4, it is preferred that the mobile terminal 100 includes a QWERTY keyboard, as used for a computer keyboard, so as to allow easy creation of an E-mail message.

Figure 5:
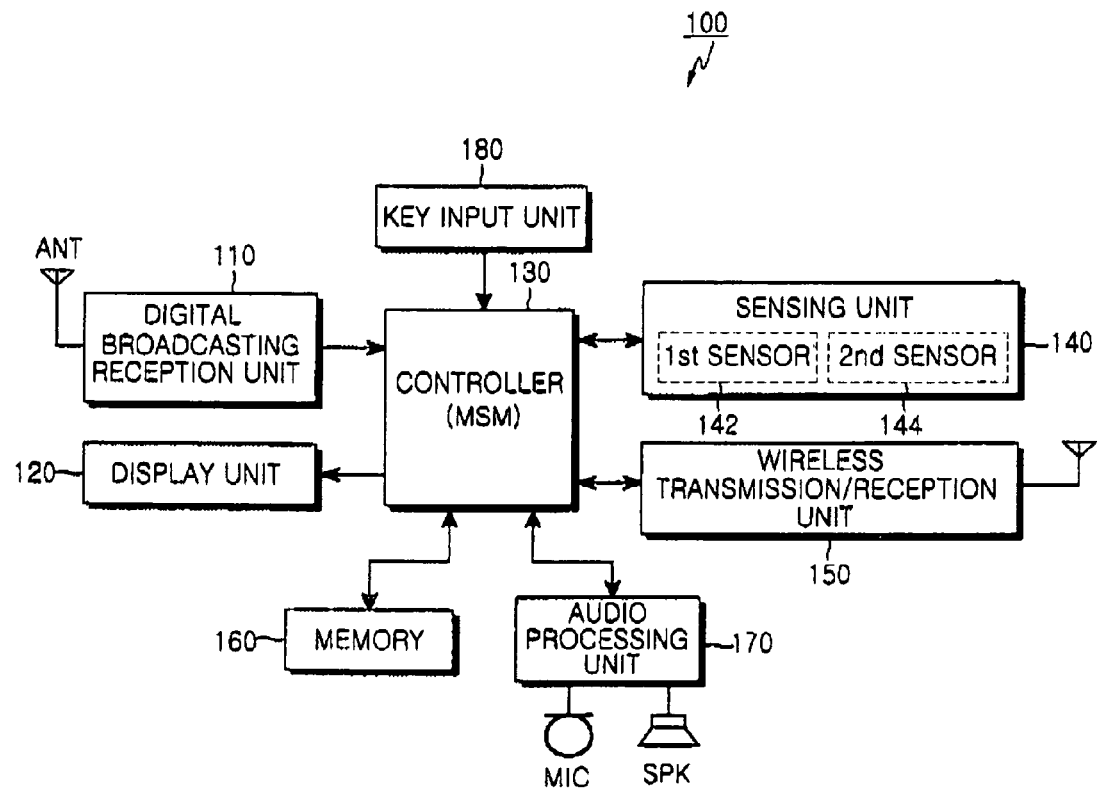
FIG. 5 is a block diagram illustrating the construction of a dual-hinge type mobile terminal according to the present invention.

FIG. 5 is a block diagram illustrating the construction of a dual-hinge type mobile terminal according to the present invention. In the following description, it is assumed that the mobile terminal includes a main housing and a folder, and the folder is opened/closed by rotating about the first and second hinge axes so as to move closely to or away from the main housing.

The mobile terminal 100 includes a digital broadcasting reception unit 110, a display unit 120, a controller 130, a sensing unit 140, a wireless transmission/reception unit 150, a memory 160, an audio processing unit 170, and a key input unit 180.

The digital broadcasting reception unit 110 receives electronic program guide (EPG) data and digital broadcasting data of a predetermined channel under the control of the controller 130, demodulates the received digital broadcasting data to a digital data stream, and outputs the digital data stream to the controller 130. The predetermined channel means a channel selected by the user.

Preferably, the display unit 120 is configured with a liquid crystal display (LCD) capable of sufficiently supporting the resolution of digital broadcasting data and various display information output through the mobile terminal 100. In this case, it is preferred that the display unit 120 includes an LCD controller, a memory capable of storing image data, and an LCD display element.

The display unit 120 outputs various information received through the wireless transmission/reception unit 150, and displays image data output from an image processing unit and user data output from the controller 130.

When the key input unit 180 senses the opening direction of the folder and outputs a corresponding signal, and the display mode of the mobile terminal 100 changes to a corresponding display mode by the control of the controller 130, and the display unit 120 displays data suitable for the corresponding display mode.

Meanwhile, when the LCD is realized in a touch screen scheme, the display unit 120 may serve as an input section.

The controller 130 (e.g. MSM) controls the entire operation of the mobile terminal 100 according to the present invention. Also, the controller 130 decodes digital broadcasting data demodulated by and transmitted from the digital broadcasting reception unit 110, and outputs the decoded data to the display unit 120 and a speaker of the audio processing unit 170 through a video signal processing unit and an audio signal processing unit. Herein, it is preferred that the controller 130 includes a demultiplexing unit, which demultiplexes the demodulated digital broadcasting data into an audio data stream and an image data stream.

The controller 130 changes and controls the operating mode of the mobile terminal 100, depending on various key signals provided from the key input unit 180.

Also, the controller 130 changes the display mode of the mobile terminal 100, depending on output signals of the key input unit 180 which has sensed the opening direction of the folder. The display mode includes the landscape mode in which the display unit 120 is transversely rotated relative to a longitudinal axis of the main housing, and the portrait mode in which the display unit 120 longitudinally extends relative to the main housing, according to the opening direction of the folder.

When an incoming call is received during a digital broadcasting service in the landscape mode, the controller 130 notifies the user of the incoming call. Then, when the display mode changes from the landscape mode to the portrait mode according to the opening direction of the folder 20, which has been sensed by the sensing unit 140, the controller 130 stops the digital broadcasting service and connects the incoming call. Following notification to the user of the incoming call, the controller 130 establishes a communication function using a speakerphone when a predetermined key (e.g. a send key) to connect an incoming call is input. In this case, it is preferred that the controller 130 interrupts the audio output of the received digital broadcast. In addition, the controller 130 may switch off the output of the display unit 120.

Herein, the interruption of the digital broadcasting service means the temporary interruption of the digital broadcasting service.

When the user requests the end of communication after the call is connected, the controller 130 releases the call connection, and the digital broadcasting service is re-performed. That is, when a predetermined key (e.g. an end key) to end the connection of a call is input in the portrait mode, the controller 130 ends the call connection, and re-performs the digital broadcasting service in the portrait mode.

Also, after an incoming call is connected in the portrait mode, the display mode changes from the portrait mode to the landscape mode according to the opening direction of the folder 20, the controller 130 ends the connection of the incoming call, and the controller 130 re-performs the digital broadcasting service in the landscape mode.

Meanwhile, when a text message is received while a digital broadcasting service is being performed in the landscape mode, the controller 130 notifies the user of the reception of the text message, and displays the received text message in a predetermined area of the output window of the received digital broadcast, i.e. in a predetermined area of the screen of the display unit 120. In this case, it is preferred that the received text message is displayed when the user recognizes the reception of the text message and selects the display of the received text message.

According to the present invention, when an incoming call is received during a digital broadcasting service in the portrait mode, the controller 130 may notify the user of the reception of the incoming call by displaying a message on the display unit 120, or by generating a vibration or bell sound. Next, when the folder 20 is closed and then is again opened in the position for entering the portrait mode, the controller 130 stops the digital broadcasting service, and connects the incoming call.

When the user requests the end of communication after the call is connected, the controller 130 releases the call connection, and re-performs the digital broadcasting service. That is, when a predetermined key to end the connection of a call is input in the portrait mode, the controller 130 ends the call connection, and re-performs the digital broadcasting service in the portrait mode.

Also, after an incoming call is connected in the portrait mode, the display mode changes from the portrait mode to the landscape mode according to the opening direction of the folder 20, the controller 130 ends the connection of the incoming call, and re-performs the digital broadcasting service is in the landscape mode.

Figure 6A:
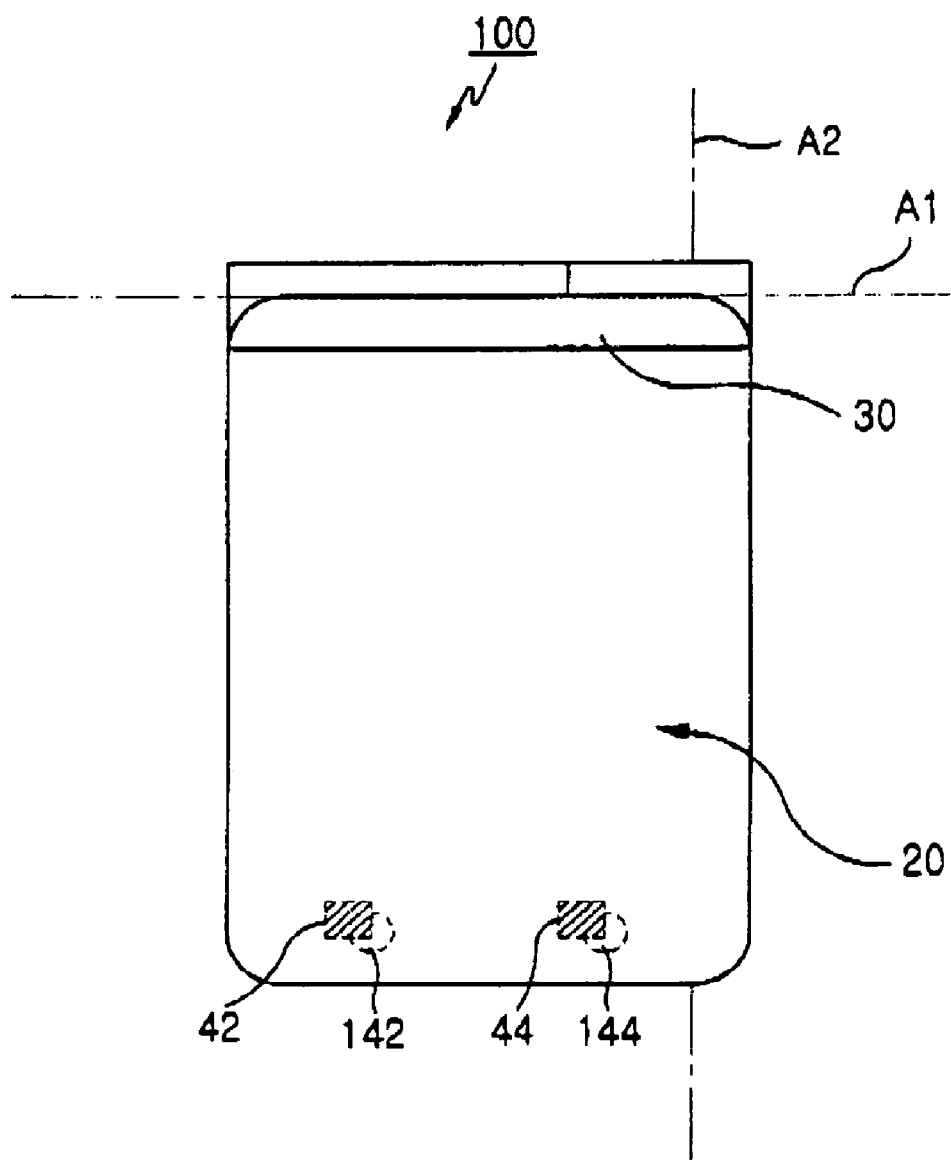
FIGS. 6A to 6C are views explaining the operation of a sensing unit in a dual-hinge type mobile terminal according to the present invention.
Figure 6B:
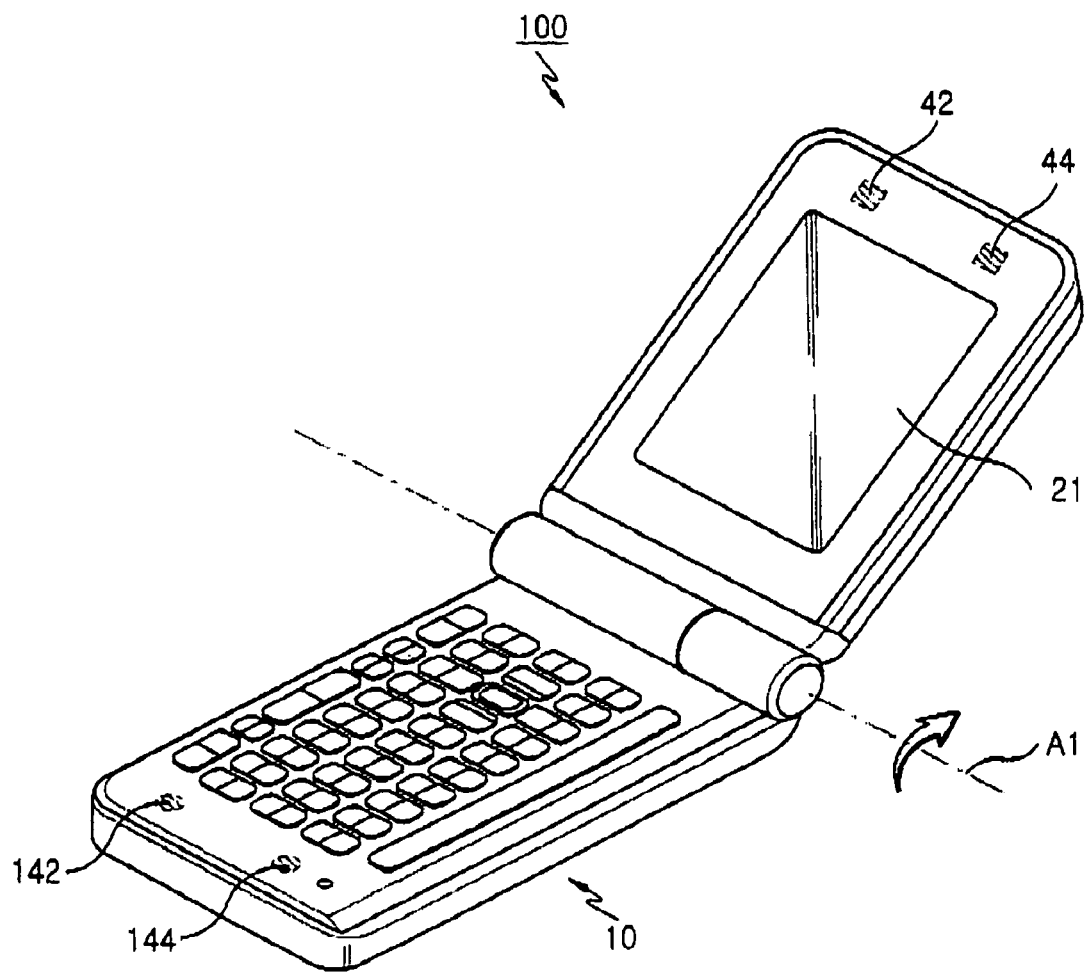
Figure 6C:
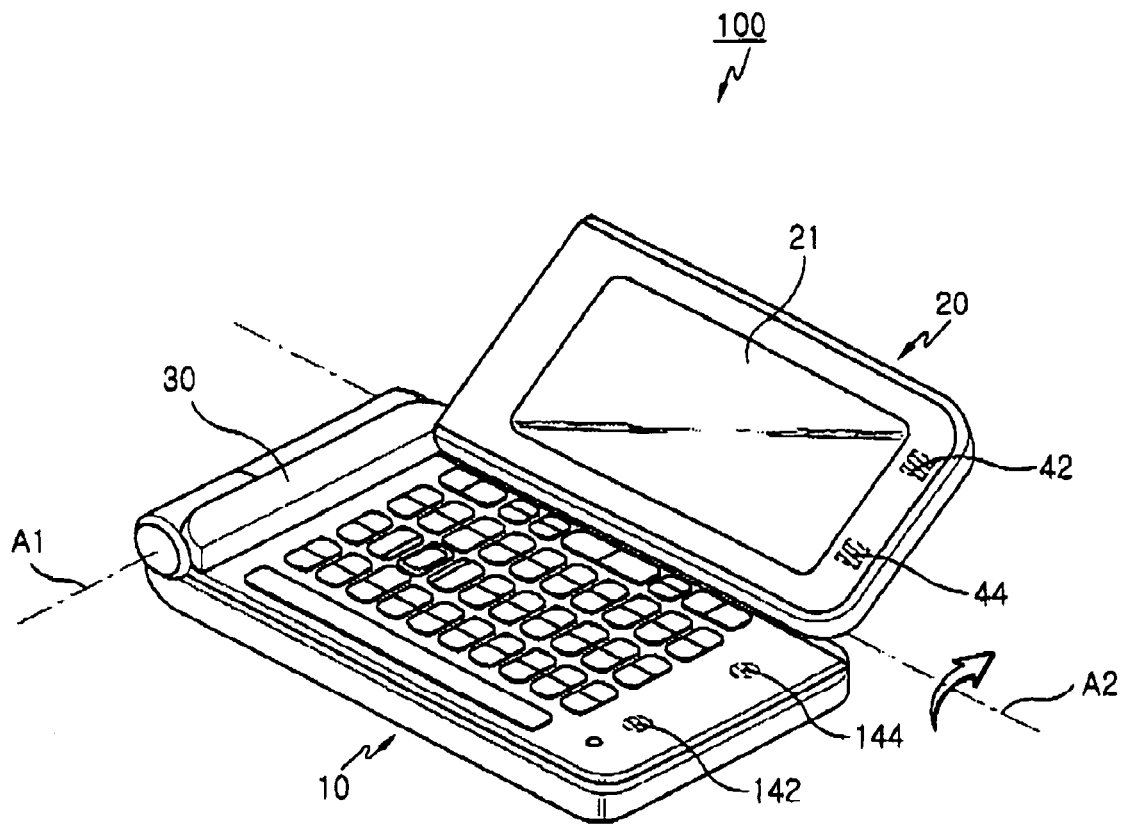

As shown in the mobile terminal 100 of FIGS. 6A to 6C, the sensing unit 140 may include a first sensor 142 and a second sensor 144, which are arranged on predetermined positions of the main housing 10 in line with each other, so that the sensors 142 and 144 can sense the direction in which the folder 20 of the mobile terminal 100 is opened. The sensors 142 and 144 are aligned with magnets 42 and 44 as shown.

Figure 7A:
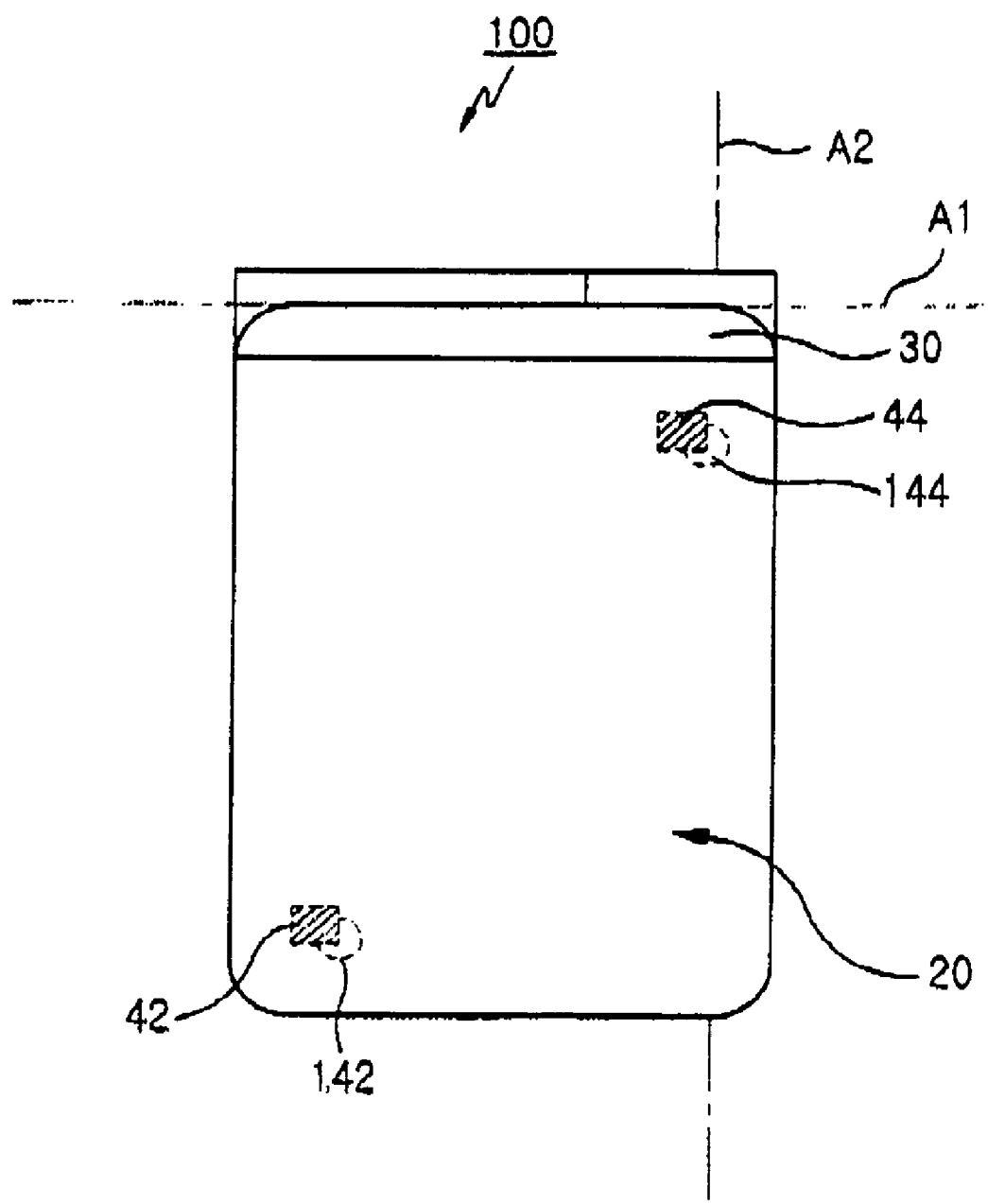
FIGS. 7A to 7C are views explaining the operation of a sensing unit in a dual-hinge type mobile terminal according to the present invention.
Figure 7B:
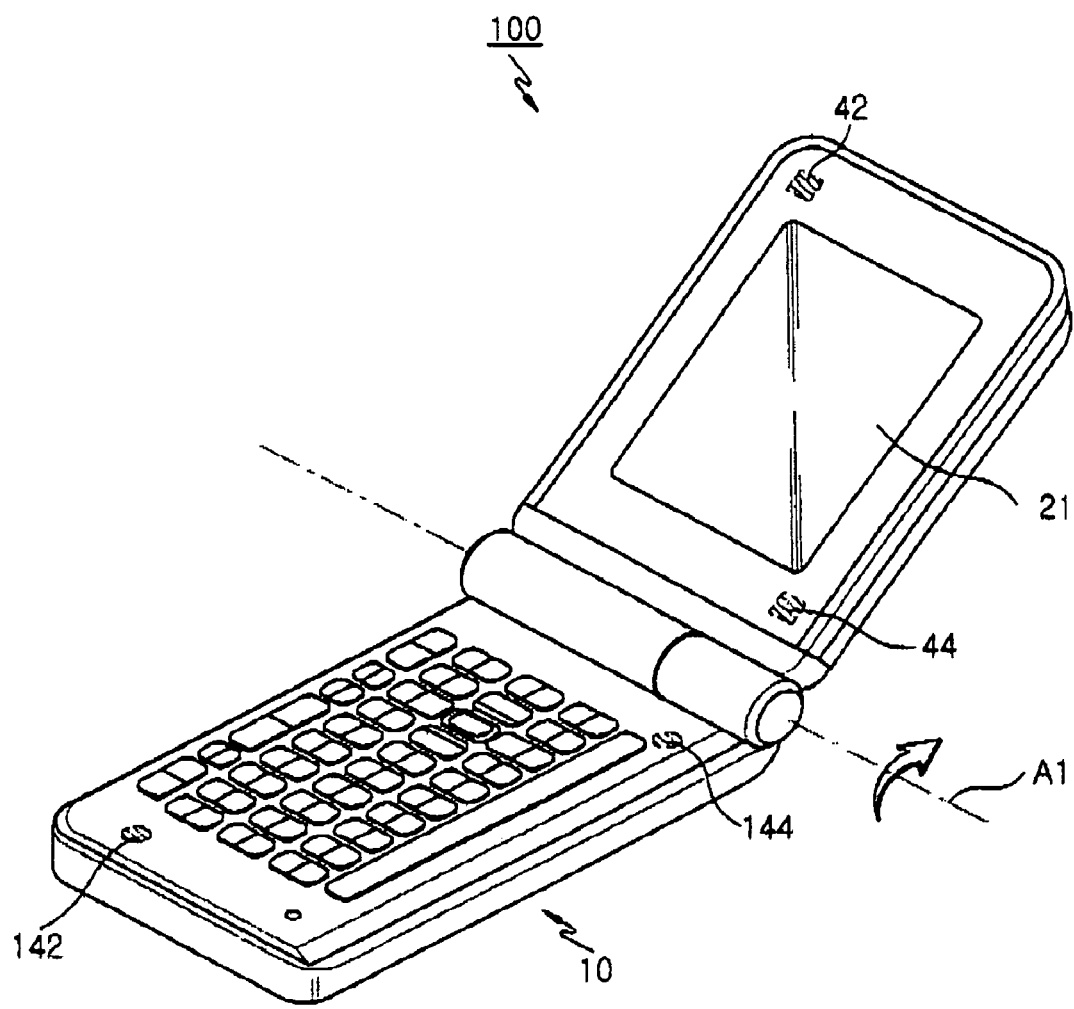
Figure 7C:
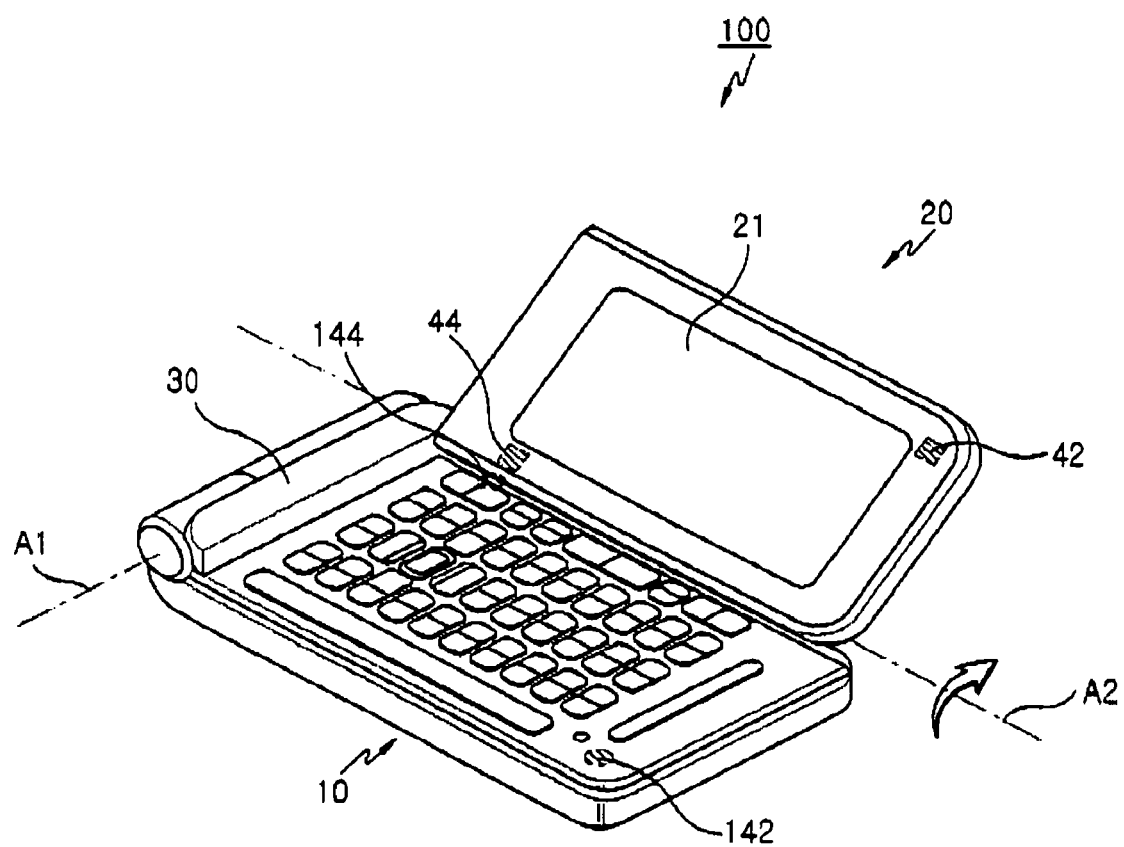

According to the present invention, as shown in the mobile terminal 100 of FIGS. 7A to 7C, the first sensor 142 may be installed at a predetermined position in the lower part of the main housing 10, while the second sensor 144 is installed at a predetermined position in the upper part of the main housing 10. It goes without saying that the second sensor 144 may be installed on the lower part of the main housing 10, while the second sensor 144 is installed on the upper part of the main housing 10. The sensors 142 and 144 may include a magnetic sensor. In this case, it is preferred that the folder 20 is provided with magnets 42 and 44 corresponding to the sensors 142 and 144, at predetermined positions facing the sensors 142 and 144 installed on the main housing 10.

Therefore, while the folder 20 is closed, the first and second sensors 142 and 144 included in the main housing 10 sense the magnets 42 and 44, respectively. Then, when the sensors 142 and 144 cannot sense the magnets on account of the opening of the folder 20, the sensing unit 140 outputs a first or second detecting signal. Herein, the first detecting signal represents that the folder 20 is opened in the direction for the portrait mode, and the second detecting signal represents that the folder 20 is opened in the direction for the landscape mode.

The sensing unit 140 senses the opening direction of the folder 20, and outputs a detecting signal corresponding to the sensed direction in which the folder 20 has been opened, to the controller 130.

In the case in which the first sensor 142 and the second sensor 144 are parallel arranged on predetermined positions of the main housing 10 parallel to and in line with each other, as shown in FIGS. 6A to 6C, when the folder 20 is opened while rotating about the first hinge axis A1 extending in the horizontal direction along the main housing 10, and thus the two sensors 142 and 144 are separated from the folder 20 at the same time (i.e. when the two sensors 142 and 144 cannot sense the magnets 42 and 44 included on the folder 20 at the same time), the sensing unit 140 outputs the first detecting signal to the controller 130.

Also, when the folder 20 is opened while rotating about the second hinge axis A2, which extends in the vertical direction along the main housing 10 so as to be parallel to one side end of the main housing 10, and thus any one of the sensors 142 and 144 is first separated from the folder 20 (i.e. when any one of the sensors 142 and 144 cannot sense a corresponding magnet 42 and 44), the sensing unit 140 outputs the second detecting signal to the controller 130.

Meanwhile, as shown in FIGS. 7A to 7C, when the first sensor 142 is installed at a predetermined position in the lower part of the main housing 10 and the second sensor 144 is installed at a predetermined position in the upper part of the main housing 10, the operation of the sensing unit 140 is as follows. When the sensing unit 140 senses that the folder 20 is opened while rotating about the first hinge axis extending in the horizontal direction along the main housing 10, through the first and second sensors 142 and 144 positioned in the lower and upper parts of the main housing 10, respectively (i.e. when both of the sensors 142 and 144 cannot sense magnets 42 and 44 installed in the folder 20), the sensing unit 140 outputs the first detecting signal to the controller 130.

Also, when the folder 20 is opened while rotating about the second hinge axis A2, which extends in the vertical direction along the main housing 10 so as to be parallel to one side end of the main housing 10, and thus the first sensor 142 senses the opening of the folder 20 but the second sensor 144 cannot sense the opening of the folder 20, the sensing unit 140 outputs the second detecting signal to the controller 130. This is a state in which only the second sensor 144 continuously senses its corresponding magnet 44.

Referring back to FIG. 5, the wireless transmission/reception unit 150 represents a radio frequency (RF) unit, which includes a high-frequency processing unit, an intermediate-frequency processing unit, and a baseband processing unit. The wireless transmission/reception unit 150 transmits/receives voice data, character data, image data and control data under the control of the controller 130.

The memory 160 may include program memory and data memory, that store various information required for controlling the operation of the mobile terminal 100 according to of the present invention. Also, the memory 160 stores various information selected and/or established by the user.

The audio processing unit 170 modulates an electrical signal input from a microphone, thereby converting the electrical signal into a voice data. The audio processing unit 170 demodulates an encoded voice data input from the wireless transmission/reception unit 150 to an electrical signal, thereby outputting the demodulated electrical signal to a speaker.

Preferably, the audio processing unit 170 includes a codec, in order to convert a digital audio signal received through the wireless transmission/reception unit 150 into an analog signal and to reproduce the analog signal, and in order to convert an analog audio signal generated from a microphone into a digital audio signal. The codec contains a data codec for processing packet data and the like and an audio codec for processing an audio signal such as a voice. The codec may be separately constructed, or may be included in controller 130.

The key input unit 180 has a key matrix structure that includes character keys, number keys, various function keys and an exterior volume key. It outputs a key input signal corresponding to a key selected by the user to the controller 130.

Preferably, the key input unit 180 has a keypad arrangement, which is similar to a keypad arrangement for a typical mobile terminal, in the portrait mode, and a keyboard arrangement, which is similar to a keyboard arrangement for a computer (e.g. QWERTY arrangement) in the landscape mode for easy handling of the key input unit 180 (e.g. when writing E-mail).

Although it is not shown, the mobile terminal 100 may further include a camera module having a camera sensor and a signal processing section. The camera sensor converts an optical signal obtained through the photographing of an image into an electric signal, and the signal processing section converts an analog image signal obtained through the photographing of the camera sensor into digital data.

Figure 8A:
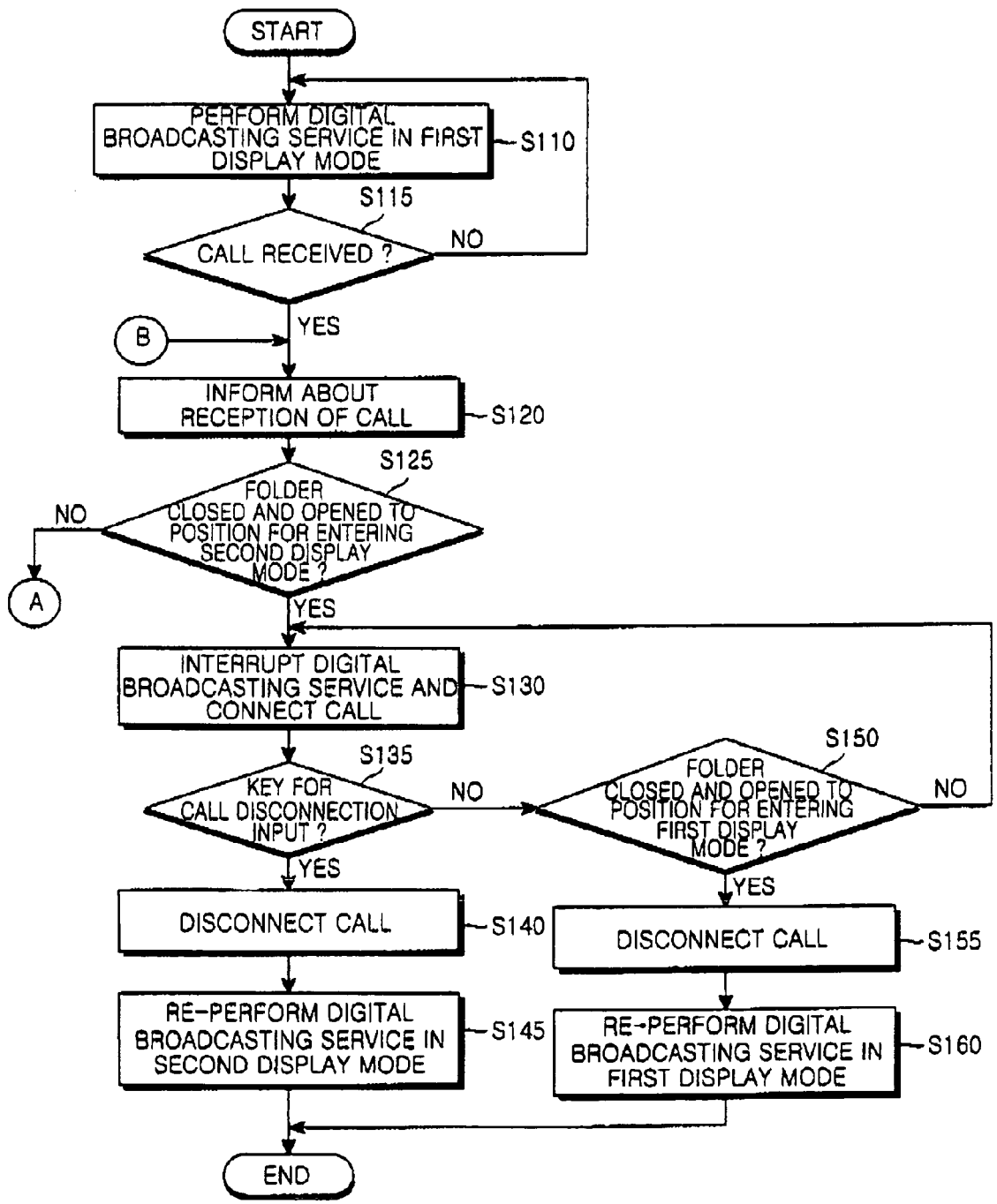
FIGS. 8A and 8B are flowcharts illustrating the operation of a dual-hinge type mobile terminal according to the present invention.
Figure 8B:
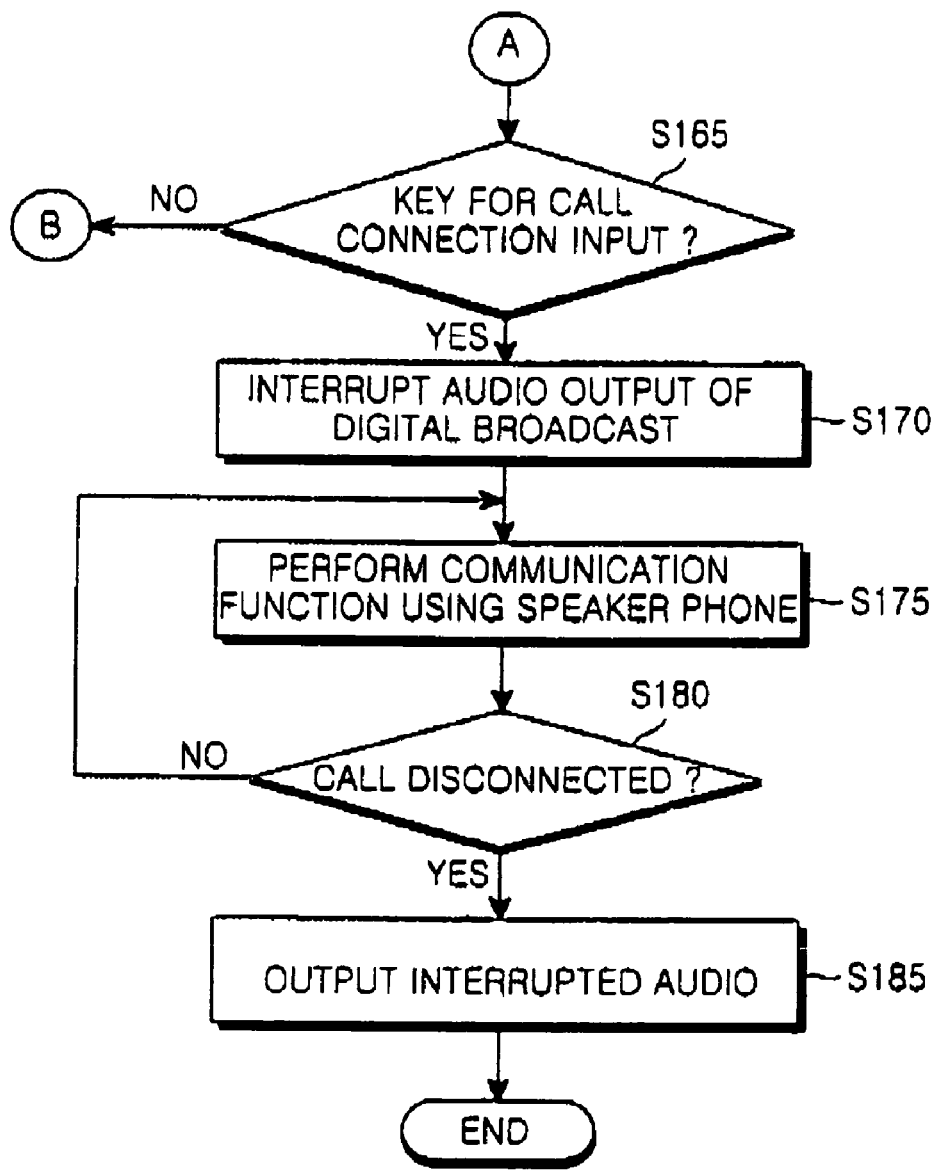

FIGS. 8A and 8B are flowcharts illustrating the operation of the mobile terminal according to the present invention. According to the present invention as shown in FIGS. 8A and 8B, the mobile terminal has a first display mode and a second display mode according to the opening direction of the folder 20. Herein, it is assumed that the first display mode is the landscape mode in which the display unit 120 is transversely rotated relative to a longitudinal axis of the main housing 10, and the second display mode is the portrait mode in which the display unit 120 longitudinally extends relative to the main housing 10.

Hereinafter, the operation of the mobile terminal as shown in FIGS. 8A and 8B will be described with reference to FIGS. 1 to 5.

In step S110, the controller 130 receives a digital broadcasting service in the first display mode (i.e. landscape mode) according to the request of the user.

In step S115, the controller 130 checks whether or not an incoming call is received through the wireless transmission/reception unit 150 during the digital broadcasting service.

When an incoming call is received, the controller 130 notifies the user of the reception of the incoming call (step S120). In this case, the controller 130 may display a message for informing the user of the reception of the incoming call in a predetermined area within the output window of a digital broadcast, or may generate a vibration or bell sound, so as to notify the user of the reception of the incoming call.

In step S125, the controller 130 checks whether the folder 20 in the first display mode is closed and is then re-opened to the position for entering the second display mode (i.e. portrait mode). The controller 130 checks whether the folder 20 is closed and is then opened while rotating about the first hinge axis A1 which extends in the horizontal direction along the main housing 10.

Upon determining from the check that the folder 20 is opened in the position for entering the second display mode, the controller 130 changes the display mode of the mobile terminal 100 to the second display mode, interrupts the digital broadcasting service, and simultaneously connects the incoming call (step S130). Herein, the interruption of the digital broadcasting service means the temporary interruption of the digital broadcasting service. In this case, it is preferred that the controller 130 switches off the output of the display unit 120. More preferably, when a predetermined key is input by the user in a state in which the output of the display unit 120 is switched off, the controller 130 displays a window for establishment of communication.

After the call is connected, the controller 130 checks whether a predetermined key (e.g. end key) for ending the connection of a call is operated (step S135).

When the predetermined key for ending the connection of a call is operated, the controller 130 ends the connection of the incoming call (step S140), and re-performs the interrupted digital broadcasting service in the second display mode (step S145). In this case, after ending the call connection, the controller 130 may display a message for checking whether the user wants to view the interrupted digital broadcast, on the display unit 120.

In contrast, when it is determined in step S135 that the predetermined key for ending the connection of a call is not operated, the controller 130 checks whether the folder 20 is closed and is then opened to the position for entering the first display mode (step S150). The controller 130 checks whether or not the folder 20 in the second display mode is closed and is then opened by rotating about the second hinge axis A2, which extends in the vertical direction along the main housing 10 so as to be parallel to one side end of the main housing 10.

Upon determining from the check that the folder 20 is opened to the position for entering the first display mode, the controller 130 changes the display mode of the mobile terminal 100 to the first display mode, and ends the call connection (step S155).

Preferably, the controller 130 ends the connection of the incoming call when the folder 20 is closed, and directly re-performs the digital broadcasting service with the folder 20 in the closed state. In this case, it is more preferable that the controller 130 ends the digital broadcasting service, if the folder 20 is not opened within a predetermined time period (e.g. 5 seconds) after the re-performance of the digital broadcasting service starts with the folder 20 in the closed state. Herein, the predetermined time period may be established by the user.

In step S160, the controller 130 re-performs the interrupted digital broadcasting service in the first display mode.

Meanwhile, if it is determined in step S125 that the folder 20 is not closed and opened to the position for entering the second display mode when the incoming call is received, the controller 130 checks whether a predetermined key (e.g. send key) for the connection of a call is operated (step S165).

When the predetermined key for the connection of a call is operated, the controller 130, the controller 130 interrupts the audio output of the received digital broadcast (step S170). In this case, it is preferred that the image output of the received digital broadcast is continuously maintained.

After interrupting the audio output of the received digital broadcast, the controller 130 performs a communication function using a speakerphone in step S175. In this case, since the audio output of the digital broadcast has been interrupted, it is preferred that the controller 130 displays an indicator for informing the user that mobile terminal is in communication on the display unit 120 while the communication function using the speaker phone is being performed.

The controller 130 checks whether the call connection is ended in step S180, and again outputs the audio of the digital broadcast in step S185 when the call connection is ended.

Meanwhile, when receiving a text message during the digital broadcasting service in the first display mode, the controller 130 may notify the user of the reception of the text message, and display the received text message on the predetermined area within the output window of the received digital broadcast. In this case, the controller 130 may display the received text message on the predetermined area within the output window of the received digital broadcast in a sliding manner.

Figure 9:
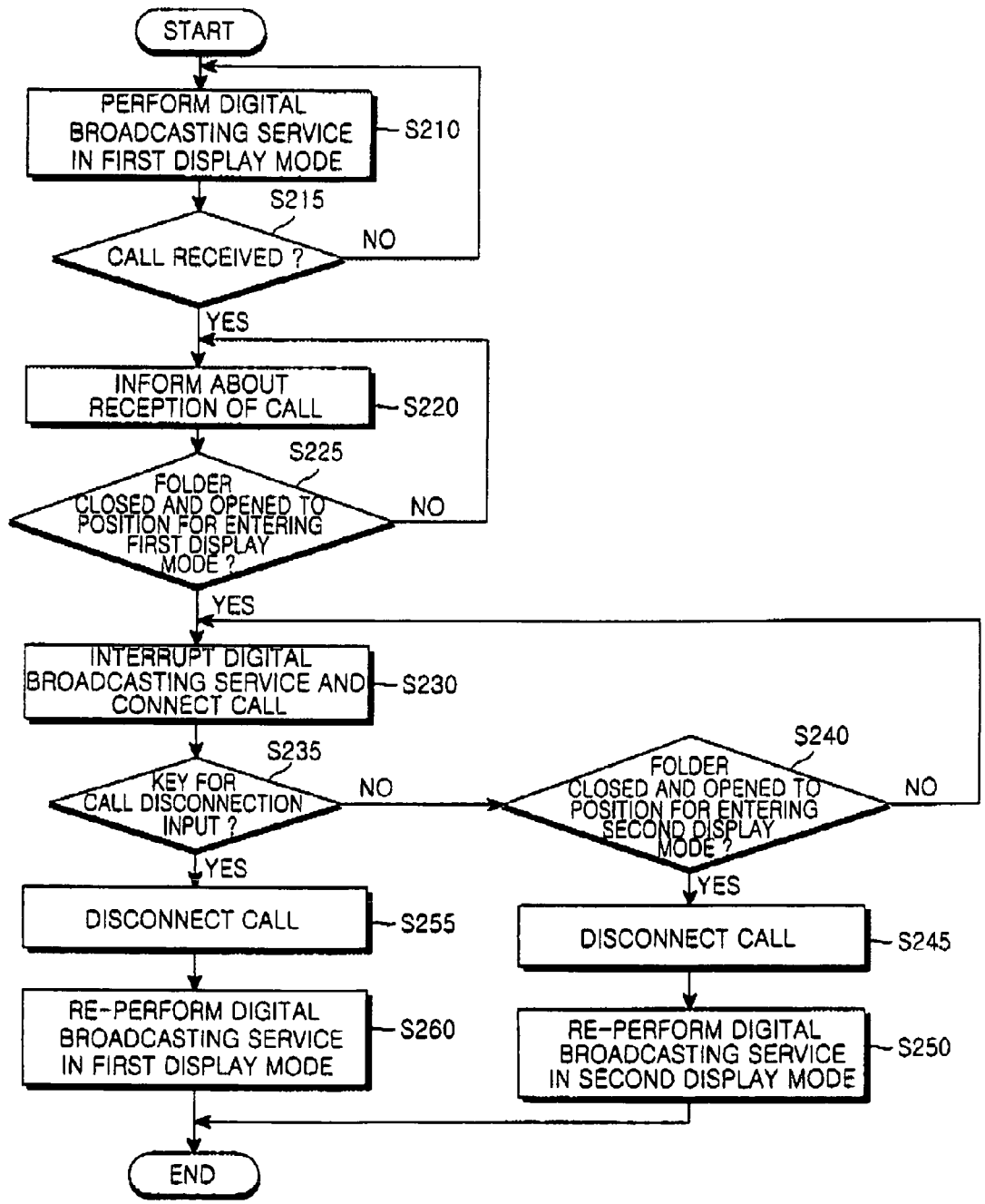
FIG. 9 is a flowchart illustrating the operation of a dual-hinge type mobile terminal according to the present invention.

FIG. 9 is a flowchart illustrating the operation of the mobile terminal according to the present invention. According to the present invention as shown in FIG. 9, the mobile terminal has a first display mode and a second display mode according to the opening direction of the folder. Herein, it is assumed that the first display mode is the portrait mode in which the display unit 120 longitudinally extends relative to the main housing, and the second display mode is the landscape mode in which the display unit 120 is transversely rotated relative to a longitudinal axis of the main housing.

Hereinafter, the operation of the mobile terminal as shown in FIG. 9 will be described with reference to FIGS. 1 to 5.

In step S210, the controller 130 receives a digital broadcasting service in the first display mode (i.e. portrait mode) according to the request of the user.

In step S215, the controller 130 checks whether an incoming call is received through the wireless transmission/reception unit 150 during the digital broadcasting service in the first display mode.

When an incoming call is received, the controller 130 notifies the user of the reception of the incoming call (step S220). In this case, the controller 130 may display a message for informing the reception of the incoming call in a predetermined area within the output window of a digital broadcast (i.e. within the screen of the display unit 120), or may generate a vibration or bell sound, so as to notify the user of the reception of the incoming call.

In step S225, the controller 130 checks whether the folder 20 in the first display mode is closed and then is again opened to the position for entering the first display mode. The controller 130 checks whether the folder 20 is closed and is then opened while rotating about the first hinge axis A1 which extends in the horizontal direction along the main housing 10.

Upon determining from the check that the folder 20 in the first display mode is closed and then is again opened in the position for entering the first display mode, the controller 130 interrupts the digital broadcasting service, and simultaneously connects the incoming call (step S230). Herein, the interruption of the digital broadcasting service means the temporary interruption of the digital broadcasting service. In this case, it is preferred that the controller 130 switches off the output of the display unit 120 in step S230. More preferably, when a predetermined key is input by the user in a state in which the output of the display unit 120 is switched off, the controller 130 displays a window for communication establishment.

The controller 130 checks whether a predetermined key (e.g. end key) for ending the connection of a call is input (step S235).

When it is determined in step S235 that the predetermined key for ending the connection of a call is not operated, the controller 130 checks whether the folder 20 is closed and is then opened to the position for entering the second display mode (i.e. landscape mode) (step S240). That is, the controller 130 checks whether the folder 20 is closed and is then opened by rotating about the second hinge axis A2, which extends in the vertical direction along the main housing 10 so as to be parallel to one side end of the main housing 10.

When it is determined as a result of the check that the folder 20 in the first display mode is closed and then is opened to the position for entering the second display mode, the controller 130 changes the display mode of the mobile terminal 100 to the second display mode, and ends the call connection (step S245).

In step S250, the controller 130 re-performs the interrupted digital broadcasting service in the second display mode.

Meanwhile, when it is determined in step S235 that the predetermined key for ending the call connection is operated, the controller 130 ends the connection of the incoming call (step S255), and re-performs the interrupted digital broadcasting service in the first display mode (step S260). In this case, after ending the call connection, the controller 130 may display a message for checking whether the user wants to view the interrupted digital broadcast, on the display unit 120.

Also, when receiving a text message during the digital broadcasting service in the first display mode, the controller 130 may notify the user of the reception of the text message, and display the received text message on the predetermined area within the output window of the received digital broadcast. In this case, it is preferred that the controller 130 displays the received text message in a sliding manner on the predetermined area within the output window of the received digital broadcast.

As described above, according to the dual-hinge type mobile terminal of the present invention, although the user changes the display mode of the mobile terminal by closing and opening the folder when an incoming call is received during the output of a digital broadcast, the incoming call is not disconnected, thereby enabling the user to communicate with a counterpart.

In addition, according to the dual-hinge type mobile terminal of the present invention, even while a digital broadcast is being output, a received incoming call or text message can be easily processed, thereby providing better convenience to the user when using the mobile terminal.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for performing a digital broadcasting service in a mobile terminal including a main housing and a folder, in which the folder is closed and opened with respect to the main housing in such a manner that the folder moves closely to or away from the main housing about a first hinge and a second hinge, and the mobile terminal has a first display mode and a second display mode according to an opening direction of the folder, the method comprising the steps of:

informing a user about reception of a call, when the call is received while a digital broadcasting service is being performed while the folder is opened away from the main housing unit in the first display mode;

maintaining the received call while the opened folder in the first display mode is closed and re-opened to either the first or second display mode according to an opening direction of the folder;

interrupting the digital broadcasting service and connecting the maintained call, after the opened folder in the first display mode is closed and re-opened;

releasing, after the re-opened folder is closed with respect to the main body and further re-opened to a display mode other than a display mode operating during the call connection, the call connection and re-performing the digital broadcasting service upon a request for call disconnection by the user; and wherein the folder is closed and opened by the user in different directions in the first and second display modes.

2. The method as claimed in claim 1, wherein the first display mode is either a landscape mode or a portrait mode, whereby, in the landscape mode, a display unit of the mobile terminal is transversely rotated relative to a longitudinal axis of the main housing, and wherein the second display mode is either the landscape mode or the portrait mode, whereby, in the portrait mode, the display unit is rotated about a first hinge axis and longitudinally extends relative to the main housing.

3. The method as claimed in claim 1, wherein, in informing the user about the reception of the call, a message is displayed in a predetermined area of a digital broadcast output window informing the user about the reception of the call.

4. The method as claimed in claim 1, wherein, in informing the user about the reception of the call, upon receipt of the call a vibration or bell sound is generated.

5. The method as claimed in claim 2, wherein connecting the call comprises:

performing a mode transition from the first display mode to the second display mode when the folder in the first display mode is closed and then opened about the first hinge axis extending in a horizontal direction along the main housing; and stopping the digital broadcasting service and connecting the call, when the mode transition to the second display mode is performed.

6. The method as claimed in claim 1, further comprising performing a communication function using a speaker phone when a predetermined key for instructing to connect the call is input, after informing the user about the reception of the call.

7. The method as claimed in claim 6, wherein performing the communication function further comprises interrupting only audio output of a digital broadcast while the communication function using the speakerphone is being performed.

8. The method as claimed in claim 6, wherein, in performing the communication function, an indicator informing the user that the mobile terminal is in communication is displayed while the communication function using the speakerphone is being performed.

9. The method as claimed in claim 6, wherein performing the communication function further comprises outputting the audio of the digital broadcast, which has been interrupted, after the call connection is ended.

10. The method as claimed in claim 2, wherein, in re-performing the digital broadcasting service, the call connection is ended and the digital broadcasting service is re-performed in the portrait mode, when a predetermined key for instructing to end the call is input.

11. The method as claimed in claim 10, wherein re-performing the digital broadcasting service further comprises displaying a message asking whether output of a digital broadcast is requested, when the call connection is ended.

12. The method as claimed in claim 2, wherein, in re-performing the digital broadcasting service, the call connection is ended and the digital broadcasting service is performed in the landscape mode, when the folder in the portrait mode is shifted into the landscape mode according to an opening direction of the folder.

13. The method as claimed in claim 12, wherein closing the folder in the first display mode and opening to either the first or second mode comprises performing a mode transition from the portrait mode to the landscape mode and ending the call connection, when the folder in the portrait mode is closed and is then opened about a second hinge axis extending in a vertical direction along the main housing so as to be parallel to one side end of the main housing, and wherein re-performing the digital broadcasting service includes re-performing the digital broadcasting service in the landscape mode.

14. The method as claimed in claim 1, wherein, in re-performing the digital broadcasting service, the call connection is ended and the digital broadcasting service is re-performed, when the folder is closed.

15. The method as claimed in claim 14, wherein, in re-performing the digital broadcasting service, when the folder is not opened within a predetermined time period while the digital broadcasting service is being re-performed, the digital broadcasting service is ended.

16. The method as claimed in claim 1, further comprising:
informing the user about reception of a text message, when the text message is received while the digital broadcasting service is being performed in the first display mode; and displaying the received text message in a predetermined area of a digital broadcast output window.

17. The method as claimed in claim 16, wherein, in displaying the received text message, the received text message is displayed in the sliding manner in a predetermined area of the digital broadcast output window.

* * * * *